(12) United States Patent
Chae et al.

(10) Patent No.: US 10,384,136 B2
(45) Date of Patent: Aug. 20, 2019

(54) USER MATCHING METHOD, APPARATUS, AND SYSTEM

(71) Applicant: NHN Entertainment Corporation, Seongnam-si (KR)

(72) Inventors: SeByoung Chae, Seongnam-si (KR); Guiun Oh, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 1385 days.

(21) Appl. No.: 14/229,502

(22) Filed: Mar. 28, 2014

(65) Prior Publication Data

US 2015/0066956 A1   Mar. 5, 2015

(30) Foreign Application Priority Data

Aug. 28, 2013  (KR) .................. 10-2013-0102440

(51) Int. Cl.
| | | |
|---|---|---|
| G06F 17/00 | (2019.01) | |
| A63F 13/798 | (2014.01) | |
| G06F 16/242 | (2019.01) | |
| A63F 13/795 | (2014.01) | |

(52) U.S. Cl.
CPC .......... *A63F 13/798* (2014.09); *A63F 13/795* (2014.09); *G06F 16/244* (2019.01)

(58) Field of Classification Search
CPC ..................... G06F 17/30525; G06F 16/244
See application file for complete search history.

(56) References Cited

U.S. PATENT DOCUMENTS

| | | | | |
|---|---|---|---|---|
| 2002/0188657 A1* | 12/2002 | Traversat | ............. | G06F 9/4416 |
| | | | | 709/201 |
| 2005/0192097 A1 | 9/2005 | Farnham et al. | | |
| 2006/0135264 A1* | 6/2006 | Shaw | .................... | A63F 13/537 |
| | | | | 463/42 |
| 2008/0108438 A1 | 5/2008 | Sugiyama et al. | | |

FOREIGN PATENT DOCUMENTS

| | | |
|---|---|---|
| JP | 2001-075972 | 3/2001 |
| JP | 2001-309440 | 11/2001 |
| JP | 2004-305575 | 11/2004 |
| JP | 2008-113783 | 5/2008 |
| JP | 2013-042935 | 3/2013 |
| JP | 2013-150645 | 8/2013 |
| KR | 10-0542084 | 1/2006 |

(Continued)

OTHER PUBLICATIONS

Notification of Reasons for Refusal dated Apr. 5, 2016, in Japanese Patent Application No. 2013-216616.

(Continued)

*Primary Examiner* — Ajith Jacob
(74) *Attorney, Agent, or Firm* — H.C. Park & Associates, PLC

(57) ABSTRACT

A method includes: storing, via at least one processor, intrinsic service elements and environmental elements in at least one storage medium on a user-by-user basis; receiving, from a first plurality of users, requests for a service over at least one network; selecting, in response to receiving the requests, a second plurality of users from the first plurality of users based on the intrinsic service elements; and matching at least two users among the second plurality of users based on the environmental elements.

22 Claims, 10 Drawing Sheets

(56) References Cited

FOREIGN PATENT DOCUMENTS

| KR | 10-2006-0064514 | 6/2006 |
| KR | 10-2012-0105839 | 9/2012 |
| KR | 10-2013-0026557 | 3/2013 |

OTHER PUBLICATIONS

Office Action dated Sep. 28, 2016, in Japanese Patent Application No. 2013-216616.
Japanese Office Action dated Jul. 14, 2015, in Japanese Patent Application No. 2013-216616.
NHN Entertainment Corporation, "Do not hesitate anymore to find the stadium," http://tetris.hangame.com/starGuide/gameIntro.nhn, Apr. 18, 2013, NHN Entertainment Corporation, Republic of Korea.
NHN Entertainment Corporation, "The game 'Tetris' is totally renewed to <Tetris Star>," http://www.navercorp.com/ko/pr/pressReleaseDetail.nhn?board.boardNum=22907, Apr. 22, 2013, NHN Entertainment Corporation, Republic of Korea.
NHN Entertainment Corporation, "Everything of Tetris star," http://tetris.hangame.com/starZone/story.nhn?cmsurl=http%3A%2F%2Fcms.hangame.com%2Fbbs2.nhn%3Fm%3Dread%26bbsid%3D990%26docid%3D4806698, Apr. 22, 2013, NHN Entertainment Corporation, Republic of Korea.
NHN Entertainment Corporation, "Help: Tetris star," http://cs.hangame.com/game/tetrisst/faqSearch.do?nodeId=3229&searchQuery=%EB%A7%A4%EC%B9%AD, Apr. 22, 2013, NHN Entertainment Corporation, Republic of Korea.
NHN Entertainment Corporation, "Q&A from Tetris star team," http://tetris.hangame.com/starZone/notice.nhn?cmsurl=http%3A%2F%2Fcms.hangame.com%2Fbbs2.nhn%3Fm%3Dread%26bbsid%3D992%26docid%3D4808210, Apr. 26, 2013, NHN Entertainment Corporation, Republic of Korea.
NHN Entertainment Corporation, "Q&A from Tetris star team," http://tetris.hangame.com/starZone/notice.nhn?cmsurl=http%3A%2F%2Fcms.hangame.com%2Fbbs2.nhn%3Fm%3Dread%26bbsid%3D992%26docid%3D4811228, May 3, 2013, NHN Entertainment Corporation, Republic of Korea.
Korean Office Action dated Nov. 19, 2018, in Korean Patent Application No. 10-2016-0034904.

* cited by examiner

1000

| User | Main access time | Time difference |
|---|---|---|
| User 1(Reference user) | 15:00 | 0 |
| User 2 | 22:00 | \|15-22\| = 7 |
| User 3 | 19:00 | \|15-19\| = 4 |
| User 4 | 07:00 | \|15-7\| = 8 |
| User 5 | 09:00 | \|15-9\| = 6 |
| User 6 | 12:00 | \|15-12\| = 3 |
| User 7 | 16:00 | \|15-16\| = 1 |

In order of {user 1, user 7}, {user 1, user 6}, {user 1, user 3}, {user 1, user 5}, {user 1, user 2}, and {user 1, user 4}

USER MATCHING METHOD, APPARATUS, AND SYSTEM

CROSS-REFERENCE TO RELATED APPLICATION

This application claims priority from and the benefit of Korean Patent Application No. 10-2013-0102440, filed on Aug. 28, 2013, which is incorporated by reference for all purposes as if fully set forth herein.

BACKGROUND

Field

Exemplary embodiments relate to a user matching method, apparatus, and system.

Discussion

An online, multiplayer game refers to a game in which a plurality of users participates over a network, for example, the Internet. For instance, a user may play a game by directly selecting another user to play a game with the user. Playing a game by finding another user per game may cause significant inconvenience on the side of users. Accordingly, technology for automatically matching users desiring to play a game in a system is typically generalized, such that a first user may find and initiate a game with any suitable second user.

It is recognized that matching users having similar game capabilities may be advantageous, but may come at a cost. For example, a unilateral game result in a matching game may cause both a winner and a loser to lose interest or fun in the game if not properly matched to play one another. Also, in proceeding with a collaboration game by matching users having different game capabilities, a user having a relatively high game capability may have an increasing dissatisfaction against a counterparty with sufficiently inferior capability. On the contrary, a user having a relatively low game capability may have difficulty playing a game and may become frustrated playing users of disproportionately higher capability. Accordingly, both users may lose their interest in a game. As such, users having similar game capabilities may be automatically matched using technology for measuring and calculating game capabilities of the respective users using a skill calculator so that users can maintain their interest or fun in a game.

Social networking service (SNS) based games may also arouse users' interest or fun in a game and may also induce additional attention through communication between users before, during, or after the game. A skill based matching method, however, simply allows users to be interested in or have fun in a game and may not provide additional fun or interest.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a user matching method, apparatus, and system that may match users based on skills of the users and a variety of environmental elements of the users.

Exemplary embodiments provide a user matching method, apparatus, and system that may encourage communication between users while playing a game using a variety of environmental elements of the users.

Exemplary embodiments provide a user matching method, apparatus, and system that may increase an amount of time used to continuously play a game by encouraging communication between users.

Additional aspects will be set forth in the detailed description which follows, and, in part, will be apparent from the disclosure, or may be learned by practice of the inventive concept.

According to exemplary embodiments, a method includes: storing, via at least one processor, intrinsic service elements and environmental elements in at least one storage medium on a user-by-user basis; receiving, from a first plurality of users, requests for a service over at least one network; selecting, in response to receiving the requests, a second plurality of users from the first plurality of users based on the intrinsic service elements; and matching at least two users among the second plurality of users based on the environmental elements.

According to exemplary embodiments, a method includes: determining, via at least one processor, individual environmental element item weights for user pairs based on comparisons of corresponding environmental element items associated with each user of a user pair; determining, for each user pair, an environment weight based on the individual environmental element item weights associated with the user pair; selecting one user pair from the user pairs based on the environment weights; and matching users of the one user pair. The comparisons correspond to inter-user differences in values of corresponding environmental element items. Each value is established based on a determined valuation scheme of a corresponding environmental element item.

According to exemplary embodiments, a file distribution system includes a file manager configured to store an installation file associated with an application, and a file transmitter configured to transmit the installation file to a user terminal in response to reception of a request associated with the user terminal. The application includes a control module configured to control the user terminal to receive a service via a server. The server is configured to: store intrinsic service elements and environmental elements on a user-by-user basis; receive, from a first plurality of users, requests for a service over at least one network; select, in response to reception of the requests, a second plurality of users from the first plurality of users based on the intrinsic service elements; and match at least two users among the second plurality of users based on the environmental elements.

According to exemplary embodiments, a file distribution system includes a file manager configured to store an installation file associated with an application, and a file transmitter configured to transmit the installation file to a user terminal in response to reception of a request associated with the user terminal. The application includes a control module configured to control the user terminal to receive a service via a server. The server is configured to: determine individual environmental element item weights for user pairs based on comparisons of corresponding environmental element items associated with each user of a user pair; determine, for each user pair, an environment weight based on the individual environmental element item weights associated with the user pair; select one user pair from the user pairs based on the environment weights; and match users of the one user pair. The comparisons correspond to inter-user differences in values of corresponding environmental element items. Each value is established based on a determined valuation scheme of a corresponding environmental element item.

According to exemplary embodiments, a system configured to provide a service to users over at least one network includes: at least one storage unit configured to store, on a user-by-user basis, intrinsic service elements and environmental elements; and at least one module configured to: receive, via the at least one network, requests for the service from a first plurality of the users, select, in response to reception of the requests, a second plurality of the users from the first plurality of the users based on the intrinsic service elements, and match at least two users of the second plurality of the users based on the environmental elements.

According to exemplary embodiments, a system configured to provide a service to users over at least one network includes: at least one storage unit configured to store environmental elements on a user-by-user basis, each environmental element including a plurality of environmental element items; and at least one module configured to: determine individual environmental element item weights for pairs of the users based on comparisons of corresponding environmental element items of the environmental elements associated with each user of a user pair, determine, for each user pair, an environment weight based on the individual environmental element item weights associated with the user pair, select one pair from the pairs of the users based on the environment weights, and match users of the one pair. The comparisons correspond to inter-user differences in values of corresponding environmental element items. Each value is established based on a determined valuation scheme of a corresponding environmental element item.

According to exemplary embodiments, users may be matched based on skills of the users and a variety of environmental elements of the users. In this manner, exemplary embodiments encourage communication between the users while the users are playing a game using a variety of environmental elements of the users. Further, exemplary embodiments may increase an amount of time used to continuously play a game by encouraging communication between the users.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain the principles of the inventive concept.

DETAILED DESCRIPTION OF THE ILLUSTRATED EMBODIMENTS

Figure 1:
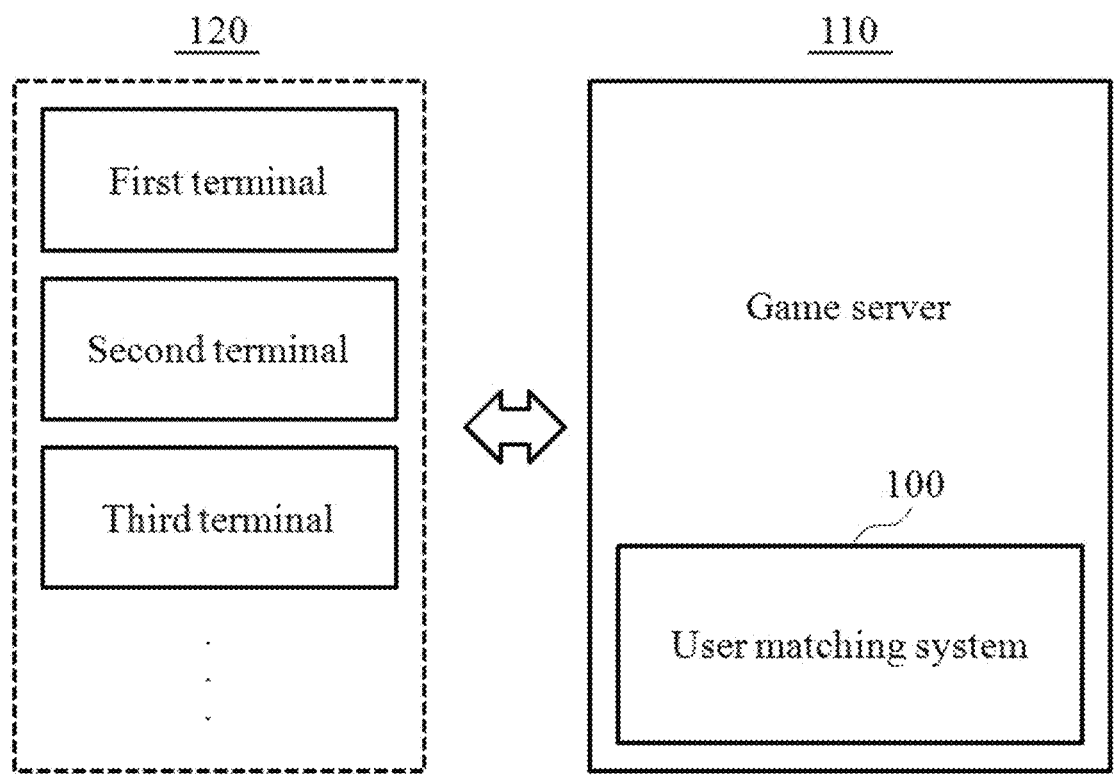
FIG. 1 is a block diagram of a user matching system, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a block diagram of a user matching system 100, according to exemplary embodiments. Referring to FIG. 1, the user matching system 100 may be a system included in a game server 110 configured to match users. For example, the user matching system 100 being included in the game server 110 may indicate that, when providing a game service to users, a computer including at least one storage unit and at least one processor is matching the users using an exemplary user matching method in order to proceed with a game.

It is contemplated, however, that the user matching system 100 may be a system that is separate from the game server 110, and may be configured to provide information regarding matching users to the game server 110. In this manner, the user matching system 100 may be implemented in a computer separate from the game server 100 to communicate with a computer that configures the game server 110 over a network, such as, for example, the Internet.

Even though the game server 110 is described as an example herein, matching of users may be used for a variety of services, such as a chatting service, for example, in addition to a game. Accordingly, the user matching system 100 may be implemented in a variety of service servers/service applications to match users with one another. For descriptive purposes, however, exemplary embodiments are described herein with respect to matching users in association with a game via the game server 110.

According to exemplary embodiments, the game server 110 may provide a game service to a plurality of terminals 120 connecting to the game server 110. The plurality of terminals 120 may refer to wired and/or wireless devices, such as personal computers, smart phones, tablets, etc., used by users to utilize the game service. The game service may refer to a service that accompanies a competition between users or collaboration between users in a virtual space. The user matching system 100 may match users for the competition or the collaboration, and, thereby, may match users based on a variety of environmental elements of the users so that users capable of building an environmental consensus may play a game.

In exemplary embodiments, the user matching system 100 may verify users that satisfy basic conditions at a matching point as part of initializing a game. The basic conditions may include at least one of three conditions. It is contemplated, however, that any other or additional conditions may be utilized in association with exemplary embodiments described herein. Exemplary conditions are described below in more detail in Table 1.

TABLE 1

| Condition | Description |
| --- | --- |
| Condition 1 | Start of a game (where matching of users may be automatically performed even though a game starts without a separate request for matching) or a time when a request for starting matching is received within a determined time range? |
| Condition 2 | Same game option set? |
| Condition 3 | Skill score within a determined range? |

Condition 1 may be used to verify a user that is requesting to start a game or start matching instead of verifying all registered users. Condition 2 may be used to match users having the same game option when game options are variously settable, such as, for example, use of an item in a game, selecting an individual play or a team play game, etc. Condition 3 may be used to match users having similar game capabilities. The skill score may indicate numerical values accumulated or calculated for users based on progress of a service or a progress result of the service. For example, the skill score may be numerical values obtained by quantifying, normalizing, or weighted averaging a variety of information, such as, for example, a game level, an experience value, a number of items being possessed, a level of an item, a record for winning and losing, a winning rate, a number of game rounds, and/or the like.

The user matching system 100 may calculate an environment weight with respect to each of user pairs including a determined user, using an environmental element of each of the determined user and other users, based on the determined user among verified users. The determined user may be a user requesting to start a game or start matching amongst verified users of the user matching system 100. For example, when users A, B, and C are verified and the determined user corresponds to user A, the user matching system 100 may calculate an environment weight of {user A, user B} and an environment weight of {user A, user C}.

An environmental element of a user may include at least one among items capable of predicting an environment of a user, such as nationality, race, gender, age, access location, residential place, main access time, main access day, service start date, service use period, alma mater, use language of the user, and/or the like. In this manner, any socioeconomic factor and/or game statistic factor may be utilized to predict or otherwise determine an environment of a user.

According to exemplary embodiments, the user matching system 100 may match users in similar environments based on a numerical environment weight by comparing environmental elements of the users. A method of using an environmental element for exemplary items will be described with reference to Table 2.

TABLE 2

| Environmental Elements | Use Description |
| --- | --- |
| Nationality | Assign a nationality weight to the same nationality or different nationality. |
| Race | Assign a race weight to the same race or a different race. |
| Gender | Assign a gender weight to the same gender or a different gender. |
| Age | Assign a relatively high age weight according to a decrease in an age difference between users. |

TABLE 2-continued

| Environmental Elements | Use Description |
|---|---|
| Access Location | Apply a relatively high current access location weight according to a decrease in a distance between current access locations of users. Alternatively, assign a current access location weight when current access locations of users are within a determined distance range. |
| Residential Place | Apply a relatively high residential place weight as residential places of users are closer to each other. Alternatively, assign a residential place weight when residential places of users are within a determined distance range. |
| Main Access Time | Apply a relatively high main access time weight according to an increase in a similarity between main access times of users. Alternatively, apply a main access time weight when main access times of users are within a determined time range. |
| Main Access Day | Apply a main access day weight when users have the same main access day. |
| Service Start Date | Apply a service start date weight when service start dates of users are within a determined period range. |
| Service Use Period | Apply a relatively high service use period weight according to an increase in a similarity between service use periods of users. |
| Alma Mater | Apply an alma mater weight when users have graduated from the same school. |
| Use Language | Apply a use language weight when users converse using the same language. |

The environment weight may be calculated as a sum of weights for the respective items included in the environmental element. For example, the environment weight may be calculated according to the following Equation 1:

Environment weight=(1−environmental element 1)* (weight of environmental element 1)+(1−environmental element 2)*(weight of environmental element 2)+ . . . +(1−environmental element $n$)*(weight of environmental element $n$)  Equation 1

In Equation 1, "n" denotes a natural number and (1−environmental element i) is to set whether to use an i-th item among n items included in the environmental element list for determining the environment weight. As such, the environmental element i may have a value of 0 or 1. For example, when a value of the environmental element i is 0, the environmental element i may be used. When a value of the environmental element i is 1, the environmental element i may not be used. As such, the value "(1−environmental element i)" may be used when determining whether to use a desired item of the environmental element for each item in a real time fashion. In this manner, the environment weight may be calculated as a sum of weights for the respectively selected items of the environmental element list.

The user matching system 100 may match users of a user pair having a relatively high environment weight. When an environment weight of {user A, user B} is "0.5" and an environment weight of {user A, user C} is "0.1", the user matching system 100 may match user B to user A instead of user C.

Also, a weight of an individual environmental element may use a weight calculation method suitable for a feature of the individual environmental element. For example, weights of individual items "age" and "gender" may be calculated according to Equation 2 and Equation 3, respectively.

Equation 2

If the absolute value of a difference between an age of a first user and an age of a second user is greater than or equal to "a,"

Age weight=0;

Otherwise, when the absolute value of a difference between an age of a first user and an age of a second user is less than "a,"

Age weight=(10−|age of first user−age of second user|)*2.

The value "a" denotes a natural number, which may be set by, for example, an administrator of the user matching system 100, a user of the user matching system 100, etc.

Equation 3

The gender value (GV) for a female=0 and the GV of male=1;

Gender weight=(1−|GV of first user−GV of second user|)*5.

For example, the age weight may be provided when the absolute value of the difference between the age of the first user and the age of the second user is less than a determined value, "a," for example, 4, and may be calculated to be relatively high according to a decrease in the difference. For example, when the first user is 30 years old and the second user is 28 years old, an age weight of {first user, second user} may be calculated as 16. As another example, the gender weight may not be provided between different genders and the gender weight of 5 may be assigned to the same gender. In this manner, based on the assumption that an age and a gender are used among items of the environmental element and the respective items have the same importance, when a=4 and the first user and the second user are the same gender, the environment weight of {first user, second user} may be calculated as 21, i.e., (16+5).

Equations 1 through 3 are merely examples of calculating weights of individual items included in the environmental element, and, as such, exemplary embodiments are not limited thereto. To this end, it is noted that the illustrative constants used in Equations 2 and 3 may be modified in any suitable manner.

In exemplary embodiments, a plurality of users may be matched with respect to a single game. For example, the user matching system 100 may match two users and then match another user using an environmental element average of the two users and environmental element values of other users. For instance, when two, initially matched users are 33 years old and 35 years old, respectively, the average age of 34 may be used as the "age of first user" in Equation 2. Also, when the initially matched two users are a male and a female, respectively, the average gender value 0.5 may be used as the "gender value of first user" in Equation 3. When a third user is matched, an environmental element average of three users may be calculated and a fourth user may be matched using the calculated average. In this manner, exemplary embodiments may be utilized to match any suitable number of users together to play a game.

According to exemplary embodiments, the game server 110, the terminals 120, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

In exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, the game server 110, the terminals 120, and/or one or more components thereof may include or otherwise be associated with one or more memories (not shown) including code (e.g., instructions) configured to cause the game server 110, the terminals 120, and/or one or more components thereof to perform one or more of the features/functions/processes described herein.

The memories may be any medium that participates in providing code/instructions to the one or more software, hardware, and/or firmware components for execution. Such memories may take many forms, including but not limited to non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Figure 2:
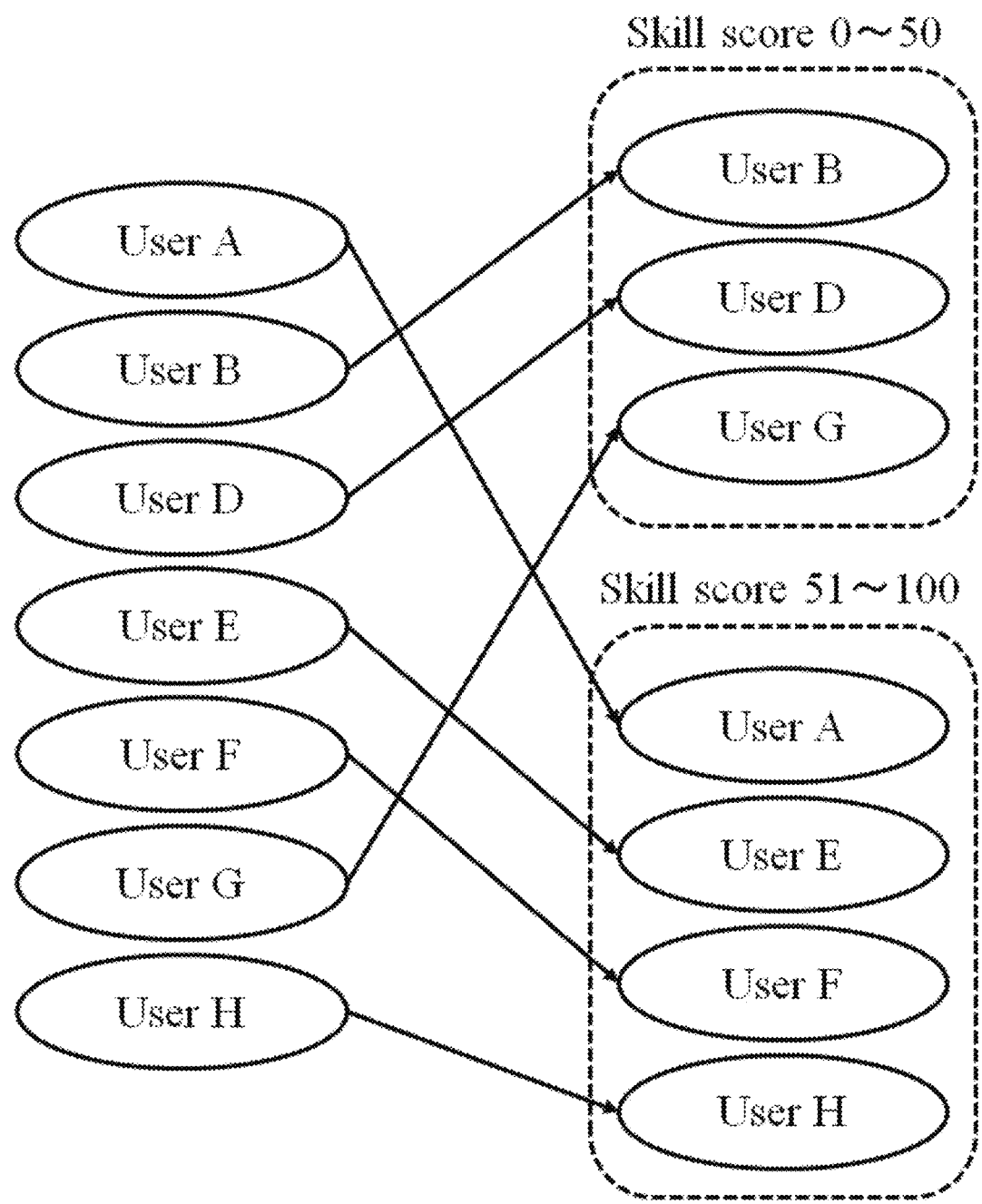
FIGS. 2 through 4 are examples of a process of matching a plurality of users, according to exemplary embodiments.
Figure 3:
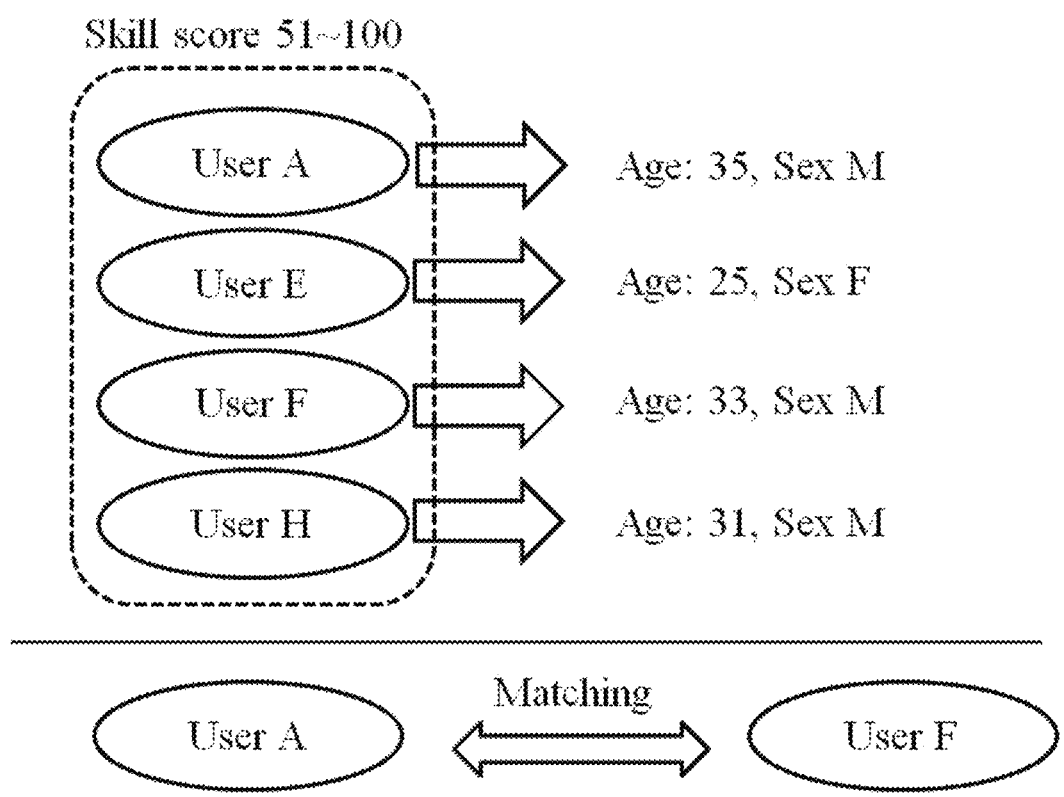
Figure 4:
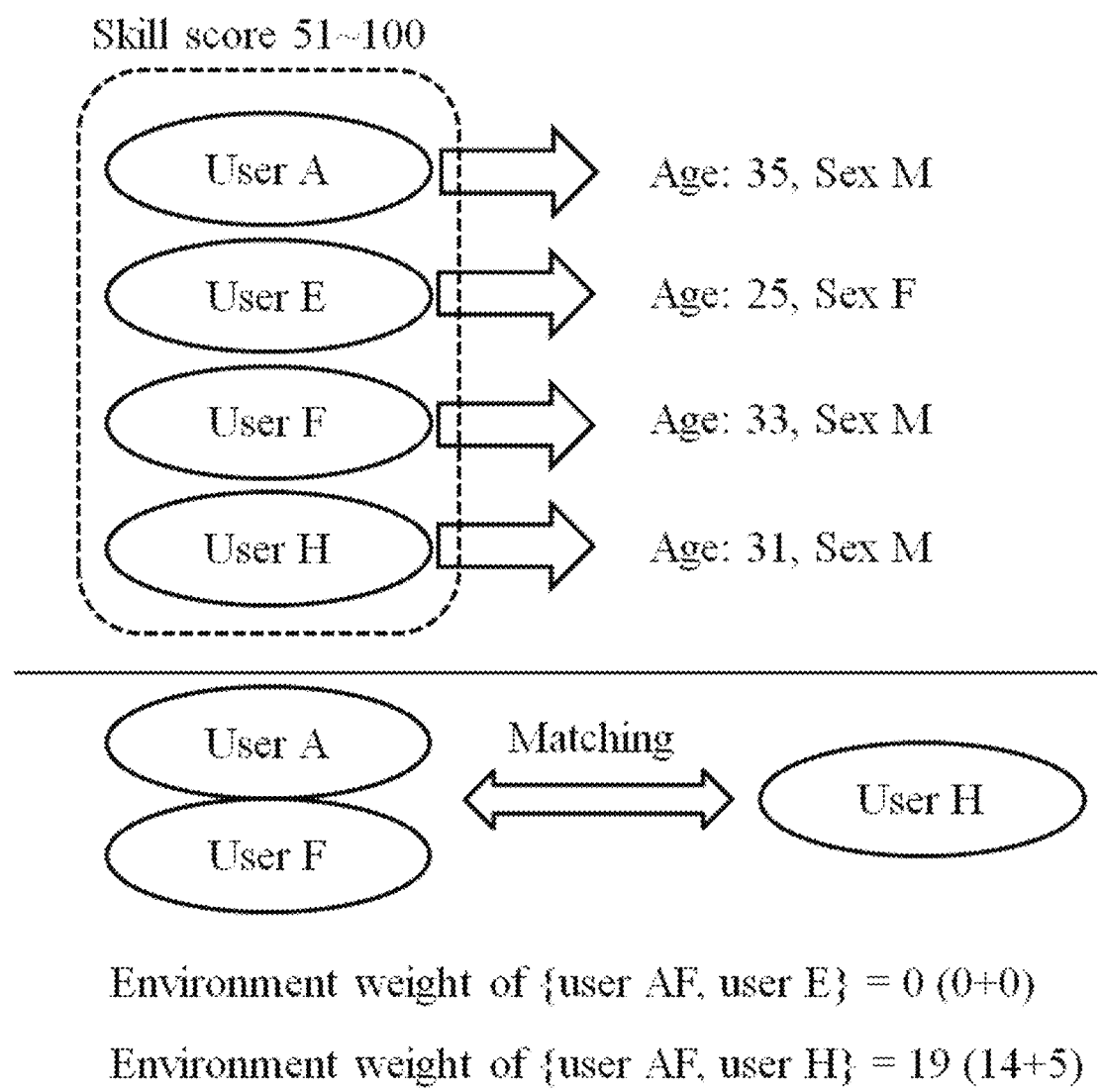

FIGS. 2 through 4 are examples of a process of matching a plurality of users, according to exemplary embodiments.

Referring to FIG. 2, seven users, e.g., users A, B, D, E, F, G, and H, having requested matching may be grouped into two groups based on their respective skill scores. The user matching system 100 may match users having similar game capabilities by matching users included in each group. Even though an example of grouping users into two groups is described for descriptive purposes, the users may be grouped into three or more groups, i.e., any suitable number of groups. Further, the users may be grouped based on a time at which matching is requested or a set game option in addition to the skill score.

Referring to FIG. 3, two users may be matched among users included in a second group corresponding to the skill score of 51 to 100. User A may be determined as a determined user, for example, a user requesting matching in the second group. Environment weights between the user A and the other users, for example, users E, F, and H, may be calculated. When using, as the environmental element, age and gender as provided in FIG. 3, and calculating weights of the individual environmental element according to Equation 2 and Equation 3, environment weights may be calculated as follows, assuming a=4:

Environment weight of {user $A$, user $E$}=0, i.e., 0+0

Environment weight of {user $A$, user $F$}=21, i.e., 16+5

Environment weight of {user $A$, user $H$}=5, i.e., 0+5

In this manner, the user matching system 100 may initially match user A and user F for a game based on the calculated environment weights of the various groupings.

A process of matching a subsequent user based on an environmental element average of matched users will be described with reference to FIG. 4. The user matching system 100 may calculate an average age value between user A and user F as 34, i.e., ((35+33)/2), and may calculate an average gender value between user A and user F as 1, i.e., ((1+1)/2). In this manner, the user matching system 100 may calculate an environment weight with respect to each of other users based on the calculated average values between user A and user F and the information corresponding to users E and H. Referring to FIG. 4, user AF may indicate that environmental element averages of the user A and the user F are used. An environment weight may be calculated as follows, assuming a=4:

Environment weight of {user $AF$, user $E$}=0, i.e., 0+0

Environment weight of {user $AF$, user $H$}=19, i.e., 14+5

In this manner, the user matching system 100 may further match the user H based on the calculated environment weights. As such, the user A, the user F, and the user H may be matched to one another. The environmental element averages of the user A, the user F, and the user H may be used to match still another user. In other words, the process may be repeated as many times to match any suitable number of users.

According to exemplary embodiments, only users having an environment weight greater than or equal to a determined value may be matched. For example, the environment weight of {user AF, user E} may have a value of 0, i.e., 0+0. In this manner, when the determined value is assumed to be 10, the user E may not be matched irrespective of being the last user in the illustrative second group of FIGS. 2 through 4. When a large number of users are assumed to have requested matching, the user E may be matched to other users through comparison between other users having requested matching subsequent to user E after primary matching, for example, after matching user A, user F, and user H together.

Although not illustrated in FIGS. 2 through 4, other users may be added to or deleted from a group in real time based on their skill score while performing a process of matching users. For example, when a user I (e.g., 34 year old male) may be added to the second group after the user A and the user F are matched as described in FIG. 3. In this manner, an environment weight of {user AF, user I} in FIG. 4 may be 25, i.e., 20+5, which is greater than the environment weight of {user AF, user H} that is 19, i.e., 14+5. Accordingly, instead of the user H being matched, the user I may be matched together with the user A and the user F.

In exemplary embodiments, a team-based game may utilize both collaboration and competition. As such, users may be matched in the same manner as described above, but teams may be randomly or sequentially grouped. Users may be matched for each team by calculating an environment weight by applying a different method to each team. For example, an environment weight may be calculated based on an age and a gender to configure team members, and an environment weight may be calculated based on an age to configure members of an opponent team. For example, when the user A, the user F, and the user H are configured as a first team based on items of the environmental element, e.g., an age and a gender, environment weights between user AFH and other users may be calculated based on an age. Users matched based on the environmental weight may be configured as a second team. In this manner, the user matching system 100 may be utilized to match users for forming teams, as well as utilized to match teams to play against one another.

Figure 5:
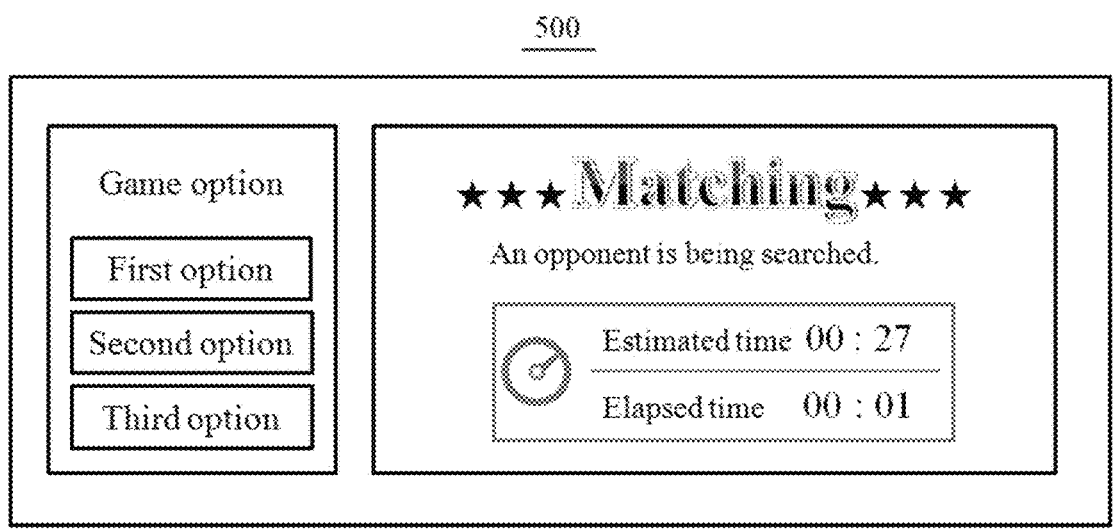
FIG. 5 is an illustrative user interface indicating an opponent for playing a game is being searched, according to exemplary embodiments.
Figure 6:
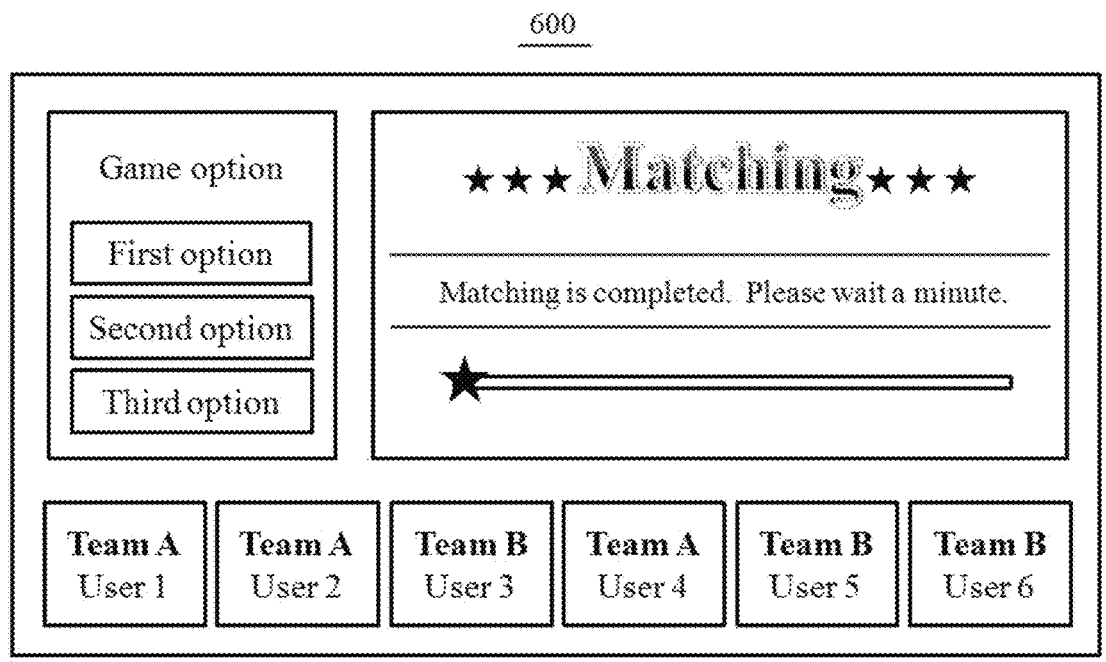
FIG. 6 is an illustrative user interface indicating that a matching between users is complete, according to exemplary embodiments.

FIG. 5 is an illustrative user interface indicating an opponent for playing a game is being searched, according to exemplary embodiments. FIG. 6 is an illustrative user interface indicating that a matching between users is complete, according to exemplary embodiments.

Referring to FIG. 5, a first user interface 500 may be configured to display a portion of a game screen of a user and may indicate that another user for playing a game with the user is being searched in response to, for instance, a request for starting a game from the user. In this manner, the first user interface 500 may provide game options referring to options of a game, such as an option to control a determination of whether to use a selection item of individual play or team play. As described above, the user matching system 100 may match users having set the same game option. The first user interface 500 may also provide an estimated time to complete the matching process, as well as an elapsed time for the matching process.

Referring to FIG. 6, a second user interface 600 may be configured to display a portion of a game screen of the user and may indicate that matching associated with the user is complete. As seen in the example of FIG. 6, "team play" is set as a game option, and, as such, three users are included in each of two teams, e.g., teams A and B. In this manner, a total of six users were matched via the user matching system 100. In exemplary embodiments, the second user interface 600 may provide a visual representation of the generated teams, as well as the users matched to the teams.

Figure 7:
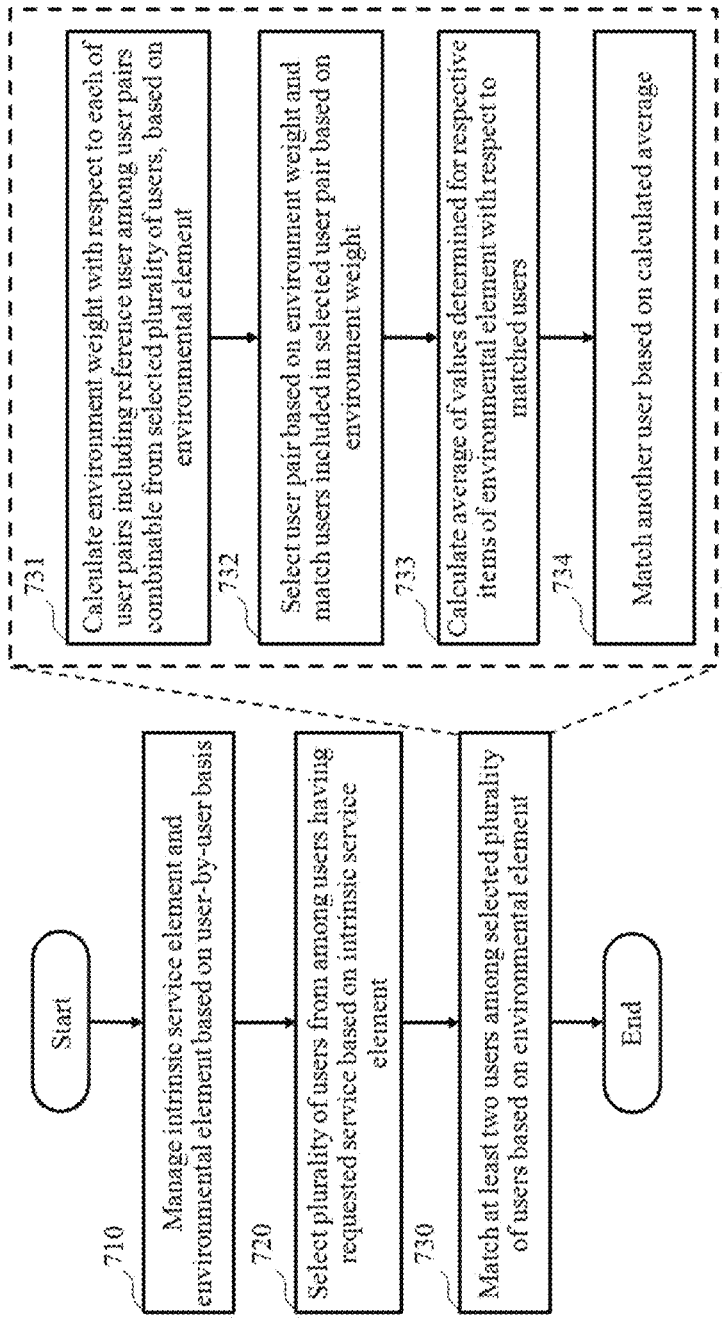
FIG. 7 is a flowchart of a user matching method, according to exemplary embodiments.

FIG. 7 is a flowchart of a user matching method, according to exemplary embodiments. The user matching method of FIG. 7 may be performed by the user matching system 100. The user matching system 100 may include at least one storage unit and at least one processor to effectuate at least one of the processes described herein. For instance, operations included in the user matching method may be performed by the user matching system 100 or at least one processor included in the user matching system 100. A process of the user matching system 100 performing operations of the user matching method will be described with reference to FIGS. 1, 4, and 7.

In operation 710, the user matching system 100 may manage an intrinsic service element and an environmental element based on a user-by-user basis. The intrinsic service element and the environmental element may be stored and managed in at least one storage unit (not shown) included in (or otherwise available to) the user matching system 100.

The intrinsic service element may include an item associated with a progress of a service, for example, a game. As an example, the intrinsic service element may include at least one of time at which a user has requested the service, an option of the service set in association with the user, and a skill score set for the user according to a service process of the user. The environmental element may include an extrinsic service element, such as information on a user and a service use pattern of the user. For example, the environmental element may include at least one of items including nationality, race, gender, age, current access location, residential place, main access time, main access day, service start date, service use period, alma mater, use language, and/or the like.

In operation 720, the user matching system 100 may select a plurality of users from among users having requested a service, based on the intrinsic service element. The intrinsic service element may be associated with one or more of the aforementioned conditions, e.g., Condition 1 through Condition 3, and, as such, may be used to select users that are currently requesting start of a service, to select users having set the same game option when various options are settable (such as, use of an item in a service, selection of an individual play or a game play), or to select users having similar game capabilities.

In operation 730, the user matching system 100 may match at least two users among the selected plurality of users based on the environmental element. As described above with reference to Table 1, the environmental element may include a variety of items and may be used in various manners based on the items. As described in association with FIG. 7, a service may be provided so that users capable of building a similar environmental consensus may play a game by applying such an environmental element to match users. Depending on the configuration of the user matching system, operation 730 may selectively include operations 731 and 732, and may selectively further include operations 733 and 734. Operations 733 and 734 may be performed when matching three or more users.

In operation 731, an environment weight may be calculated with respect to each of user pairs including a reference user among user pairs combinable from the selected plurality of users based on the environmental element. As an example, the user matching system 100 may calculate an individual environmental element item weight by comparing, for each item, environmental elements of the users included in the selected user pair, and may calculate the environment weight based on the individual environmental element item weight.

The individual environmental element item weight may be calculated by applying an inter-user difference associated with each of values determined for the respective items of the environmental element to the users included in the user pair based on a method determined for a corresponding item. In this manner, values determined for the respective items may be determined based on information set for the respective items of a user. For example, in an "age" item, an age of a user may be determined as the value for the "age" item. In a "gender" item, a value of the "gender" item may be determined such that a female is assigned a value of 0 and a male is assigned a value of 1. As another example, in a "nationality" item, a value of the "nationality" item may be determined such that a Korean nationality is assigned a value of 1 and other nationalities are assigned a value of 0. In a "current access location" item, 0 may be determined as a value of the "current access location" item with respect to a location of the reference user. A distance difference between the location of the reference user and locations of other users may be determined as the value of the "current access location" item with respect to the other users. It is contemplated, however, that any other value assigning methodology may be utilized in association with exemplary embodiments described herein.

In exemplary embodiments, an item to be used to calculate the environment weight may be determined among items included in the environmental element based on a service option set for a user. For example, in a game service, a game option capable of selecting an individual play or a team play may be present. When the team play is set, items for "age," "gender," and "current access location" may be selected. When the individual play is set, items for "age" and "gender" may be selected. An environment weight may be calculated based on an individual environmental element item weight with respect to each of the selected items. It is noted that any suitable number of items may be utilized in association with the game option.

In operation 732, the user matching system 100 may select a user pair based on the environment weight and may match users included in the selected user pair. For example, the user matching system 100 may select a user pair having the largest environment weight.

In operation 733, the user matching system 100 may calculate an average of values determined for the respective items of the environmental element, such as the calculation method described with reference to FIG. 4. The averaging may be utilized in association with matching a plurality of users with one another in association with, for example, a team game. In this manner, the average value may correspond to a plurality of users to be matched with one or more other users.

In operation 734, the user matching system 100 may additionally match another user based on the calculated average. For example, the user matching system 100 may set, as a reference value, a virtual user having the calculated average as a value determined for each item of the environmental element, and may additionally match another user by repeatedly performing operations 731 and 732 with respect to the virtual user set as the reference user. It is noted that as more users are matched to the virtual user, the average value may change based on the newly matched user.

Figure 8:
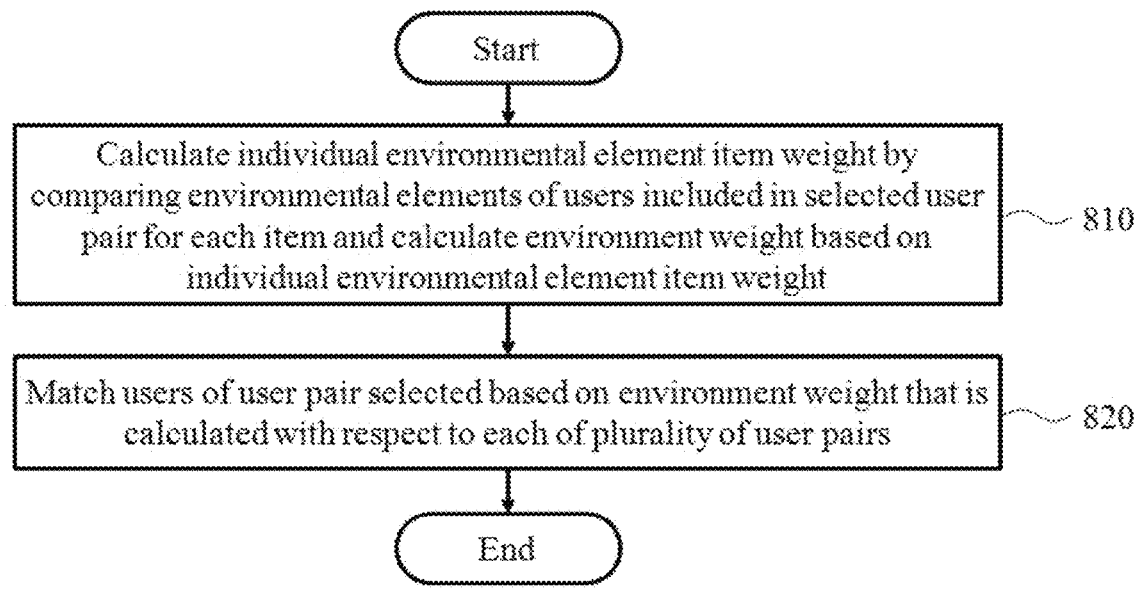
FIG. 8 is a flowchart of a user matching method, according to exemplary embodiments.

FIG. 8 is a flowchart of a user matching method, according to exemplary embodiments. The user matching method of FIG. 8 may be performed by the user matching system 100. Operations included in the user matching method may be performed by the user matching system 100 or at least one processor included in the user matching system 100. A process of the user matching system 100 performing operations of the user matching method will be described with reference to FIGS. 1 and 8.

In operation 810, the user matching system 100 may calculate an individual environmental element item weight by comparing, for each item, environmental elements of the users included in the selected user pair, and may calculate the environment weight based on the individual environmental element item weight. Here, the individual environmental element item weight may be calculated by applying an inter-user difference associated with each of values determined for the respective items of the environmental element to the users included in the user pair based on a method determined for a corresponding item. An item to be used to calculate the environment weight may be determined among items included in the environmental element based on a service option set for the user.

In operation 820, the user matching system 100 may match users of a user pair selected based on the environment weight that is calculated with respect to each of a plurality of user pairs. For example, when matching two users, the user matching system 100 may calculate an environment weight with respect to each of user pairs including users allowed to be matched, and may match users of a user pair having the largest environment weight.

It is noted that associated descriptions omitted from the descriptions corresponding to FIGS. 7 and 8 may refer to descriptions previously provided in association with at least one of FIGS. 1 through 6. Also, the user matching methods described above with reference to FIGS. 7 and 8 may be performed by one of the plurality of terminals 120 instead of (or in addition) to the user matching system 100. For example, instead of using a separate server, for example, the game server 110, a determined terminal may match users by way of functioning as a server for matching purposes. It is also noted that users may be matched for each terminal. In this manner, an application for implementing a user matching method may be installed in a terminal, and the terminal may match users according to a control of the application. A file distribution system (not shown) may distribute an installation file of the application to the terminal to facilitate such features.

According to exemplary embodiments, a file distribution system configured to distribute a file for installing an application in a terminal 120 may be made accessible to one or more terminals 120 via, for instance, one or more communication networks. Although not illustrated, the file distribution system may include a file manager configured to manage a file and a file transmitter configured to transmit the file to the terminal 120 in response to a request of the terminal 120. The application may include a control module configured to control the terminal 120 to be provided with a service through communication with a server, such as communication over one or more communication networks. In this manner, the server may manage an intrinsic service element and an environmental element based on a user-by-user basis, may select a plurality of users among users having requested a service based on the intrinsic service element, and may match at least two of the selected plurality of users based on the environmental element. The server may refer to the user matching system 100 configured to perform the user matching method of FIG. 7.

In exemplary embodiments, a file distribution system may also be configured to distribute a file for installing an application in a terminal 120 of a user. The file distribution system may include a file manager (not shown) configured to manage a file and a file transmitter (not shown) configured to transmit the file to a terminal 120 in response to a request of the terminal 120. The application may also include a control module (not illustrated) configured to control the terminal 120 to be provided with a service through communication with a server. In this manner, the server may calculate an individual environmental element item weight by comparing, for each item, environmental elements of the users included in a user pair, may calculate an environment weight based on the individual environmental element item weights, and may match users of a user pair selected based on the environment weight that is calculated with respect to each of a plurality of user pairs. The individual environmental element item weights may be calculated by applying an inter-user difference associated with each of the values determined for the respective items of the environmental element based on a method determined for a corresponding item. The server may refer to the user matching system 100 configured to perform the user matching method of FIG. 8.

Figure 9:
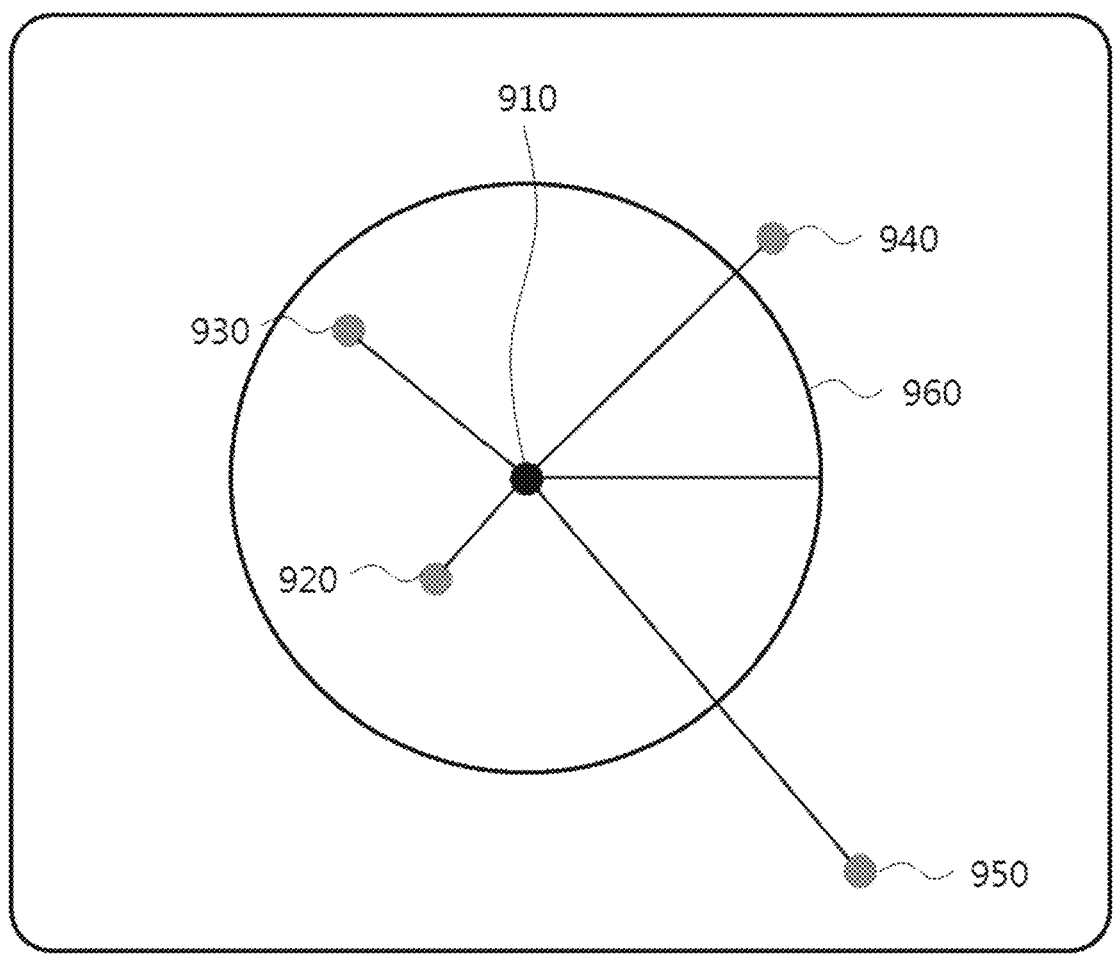
FIG. 9 is an example of calculating an individual environmental element item weight based on a "residential place" item, according to exemplary embodiments.

FIG. 9 is an example of calculating an individual environmental element item weight based on a "residential place" item, according to exemplary embodiments. Referring to FIG. 9, points 910, 920, 930, 940, and 950 may represent locations corresponding to residential places of user 1, user 2, user 3, user 4, and user 5, respectively. The point 910 may indicate the residential place of user 1, and a line connecting points 920 through 950 to point 910 may indicate a distance between the locations corresponding to residential places of users 1 through 5.

As described above, a relatively high residential place weight may be assigned as residential places of users are located closer to each other. Alternatively (or additionally), a residential place weight may be assigned when residential places of users are within a determined distance range. Circle 960 may indicate the determined distance range with respect to user 1. It is contemplated, however, that the "distance range" may additionally or alternatively correspond to any suitable geographic demarcation of points within a defined zone. That is, circle 960 may correspond to any suitable geometric configuration defining a zone in which a residential place weight may be assigned when residential places of users are located therein.

When assigning a relatively high residential place weight according to a decrease in a distance between residential places of users, a relatively high residential place weight may be assigned in order of user pairs, such as, for instance, {user 1, user 2}, {user 1, user 3}, {user 1, user 4}, and {user 1, user 5}. When using the determined distance range/zone definition, a residential place weight may be assigned to user pairs {user 1, user 2} and {user 1, user 3} including users positioned within the circle 960. In this manner, different residential place weights may be assigned to the user pairs {user 1, user 2} and {user 1, user 3} based on a distance difference between point 910 and points 920 and 930. For example, user pair {user 1, user 2} may be assigned a higher residential place weight than user pair {user 1, user 3} since user 2 is closer to user 1 than user 3 is to user 1. When using the distance difference for a current access location among items of the environmental element, a current access location weight may be calculated in a substantially similar manner.

Figure 10:
FIG. 10 is a table including a time difference between main access times of users and a reference user, according to exemplary embodiments.
Figure 10:

FIG. 10 is a table including a time difference between main access times of users and a reference user, according to exemplary embodiments. As described above, a relatively high main access time weight may be applied according to an increase in a similarity between main access times of users. Alternatively (or additionally), a main access time weight may be applied when main access times of users are within a determined time range. In the first case, a relatively high access time weight may be applied in order of {user 1, user 7}, {user 1, user 6}, {user 1, user 3}, {user 1, user 5}, {user 1, user 2}, and {user 1, user 4}. In the second case, when the determined time range is four hours, a main access time weight may be applied to {user 1, user 7} and {user 1, user 6}. In this manner, different main access time weights may be applied based on a time difference. Weights of other items included in the environmental element using the time difference may be calculated in a substantially similar manner.

According to exemplary embodiments, users may be grouped based on the intrinsic service element and then matched among the grouped users based on the environmental element. Depending on the implementation, a skill score may be classified as the environmental element, not the intrinsic service element. For example, a skill score weight based on a difference in the skill score between users may be used as an environment weight. Alternatively (or additionally), the skill score weight may be applied in a manner different from the environment weight. For example, a total environment weight and the skill score weight may be initially calculated. A final weight may be calculated by applying different weighted coefficients to the calculated environment weight and skill score weight and then adding or multiplying the same. Another user to be matched to a reference user may be determined based on the final weight.

Table 3 provides exemplary items of an environmental element and items of a skill score for calculating the skill score with respect to five users. A "location" item of the environmental element may indicate a relative distance from a user A corresponding to a reference user.

TABLE 3

| User | Items of Environmental Element | | | Items of Skill Score | |
|---|---|---|---|---|---|
| | Location | Gender | Age | Winning Rate | Level |
| A | 0 km | 1 (M) | 27 | 70% | 5 |
| B | 32 km | 1 (M) | 29 | 65% | 7 |
| C | 11 km | 0 (F) | 24 | 50% | 2 |
| D | 84 km | 1 (F) | 21 | 95% | 25 |
| E | 250 km | 0 (F) | 35 | 45% | 12 |

A weighted coefficient to be applied to each item of the environmental elements of Table 3 may be assumed as provided in Table 4.

TABLE 4

| Location | Gender | Age |
|---|---|---|
| 10 (within 50 km) | 5 (Same Gender) | (10 − |Age Difference|) * 2 (|Age Difference| ≤ 4) |
| 0 (beyond 50 km) | 0 (Different Gender) | 0 (|Age Difference| > 4) |

Environmental weights of other users with respect to user A may be calculated as follows by referring to Table 3 and Table 4.

Environment weight of {user A,user B}=10+5+16=31

Environment weight of {user A,user C}=10+0+14=24

Environment weight of {user A,user D}=0+5+0=5

Environment weight of {user A,user E}=0+0+0=0

In this manner, the environment weight of {user A, user B} is largest, and, as such, user B and user A may be matched when considering the environmental element.

Weighted coefficients to be applied for each item of the skill score may be assumed as provided in Table 5.

TABLE 5

| Winning Rate (WR) | Level |
|---|---|
| 3 (|WR Difference| ≤ 5%) | (11 − |Level Difference|) * 3 (|Level Difference| ≤ 5) |
| 2 (5% < |WR Difference| ≤ 10%) | (11 − |Level Difference|) * 1 (5 < |Level Difference| ≤ 10) |
| 1 (|WR Difference| > 10%) | 0 (|Level Difference| > 10) |

Skill score weights of other users with respect to user A may be calculated as follows by referring to Table 3 and Table 5.

Skill score weight of {user A,user B}=3+27=30

Skill score weight of {user A,user C}=1+24=25

Skill score weight of {user A,user D}=1+0=0

Skill score weight of {user A,user E}=1+4=5

When a total weight is calculated by adding up the environment weight and the skill score weight, total weights of other users with respect to user A may be calculated as follows.

Total weight of {user A,user B}=31+30=61

Total weight of {user A,user C}=24+25=49

Total weight of {user A,user D}=5+0=5

Total weight of {user A,user E}=0+5=5

In this example, the total weight of {user A, user B} is largest, and, as such, user B may be matched to user A. The environment weight and the skill score weight may be used to calculate a total weight by applying a variety of methods, such as a weighted sum or multiplication.

According to exemplary embodiments, the environmental element may further include an item capable of representing a user's preference about a determined field, such as an online shopping mall, a sports team, mass communication, a mobile communication provider, and the like, which are preferred by the user. Users may be grouped and, thereby, matched in the determined field based on a level of preference. A corresponding advertisement may be displayed to each of the groups. For example, while a service is being provided, an online shopping mall advertisement or a sports team advertisement may be displayed to users belonging to a corresponding group. Also, a reward based on a progress result of a service may be provided to users belonging to a group. An advertising effect may be enhanced by displaying a customized advertisement based on a level of preference of users.

According to exemplary embodiments, it is possible to match users based on skills of the users and a variety of environmental elements of the users, as well as possible to encourage communication between the users while playing a game using a variety of environmental elements of the users. Further, it is possible to increase an amount of time used to continuously play a game by encouraging communication between the users.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A method, comprising:
    receiving, via at least one processor from a first plurality of users, requests for a networked service over at least one network;
    selecting, via the at least one processor in response to receiving the requests, a second plurality of users from the first plurality of users based on intrinsic service elements stored in association with the first plurality of users;
    matching, via the at least one processor according to a first scheme, users among the second plurality of users to form a first group of users based on environmental elements stored in association with the second plurality of users;
    matching, via the at least one processor according to a second scheme different from the first scheme, users among the second plurality of users to form a second group of users based on the environmental elements; and
    providing, via the at least one processor, a session of the networked service between the first group of users and the second group of users.

2. The method of claim 1, wherein:
    the intrinsic service elements are stored on a user-by-user basis; and
    the intrinsic service element of a user comprises information associated with at least one of a reception time of a request of the user, an option of the networked service set in association with the user, and a skill score set for the user according to a service process of the user.

3. The method of claim 1, wherein:
    the environmental elements are stored on a user-by-user basis; and
    the environmental element of a user comprises information associated with at least one of a nationality of the user, a race of the user, a gender of the user, an age of the user, a current access location of the user, a residential place of the user, a main access time of the user, a main access day of the user, a service start date of the user, a service use period of the user, an alma mater of the user, and a language of the user.

4. The method of claim 1, wherein matching users among the second plurality of users to form the first group of users or the second group of users based on the environmental elements stored in association with the second plurality of users comprises:
    determining environment weights with respect to pairs of users based on the environmental elements, each pair of users comprising the same reference user and a respectively different user from the second plurality of users;
    selecting a user pair from the pairs of users based on the environment weights; and
    matching the reference user to the respectively different user of the user pair.

5. The method of claim 4, wherein:
    the environmental elements are stored on a user-by-user basis;
    each environmental element comprises one or more items; and
    determining an environment weight with respect to pairs of users based on the environment elements comprises:
        determining, for each of the one or more items, an individual environmental element item weight based on a comparison of corresponding items associated with each user of a pair of users; and
        determining the environment weights based on the individual environmental element item weights.

6. The method of claim 5, wherein:
    the comparison corresponds to an inter-user difference in values of the corresponding items; and
    each value is established based on a determined valuation scheme of a corresponding item.

7. The method of claim 4, wherein matching the users among the second plurality of users into the first group of users or the second group of users based on the environmental elements stored in association with the second plurality of users further comprises:
    determining an average environment weight between the reference user and the respectively different user of the user pair; and
    matching another user with the reference user and the respectively different user based on the average environment weight.

8. The method of claim 4, further comprising:
selecting one or more items of the environmental elements based on a service option set for each of the users of the second plurality of users,
wherein the environment weights are determined based on the one or more items.

9. At least one non-transitory computer-readable storage medium comprising one or more instructions that, when executed, are configured to implement the method of claim 1.

10. A file distribution system configured to distribute, to a terminal, an installation file that, when executed by the terminal, is configured to install an application on the terminal, the application being configured to implement the method of claim 1.

11. A file distribution system, comprising:
a storage configured to store an installation file for an application; and
a transmitter configured to transmit the installation file to a user terminal in response to reception of a request associated with the user terminal,
wherein the application is configured to control the user terminal to receive a networked service via a server, and
wherein the server is configured to:
receive, from a first plurality of users, requests for the networked service over at least one network;
select, in response to reception of the requests, a second plurality of users from the first plurality of users based on intrinsic service elements stored in association with the first plurality of users;
match, according to a first scheme, users among the second plurality of users to form a first group of users based on environmental elements stored in association with the second plurality of users;
match, according to a second scheme different from the first scheme, users among the second plurality of users to form a second group of users based on the environmental elements; and
provide a session of the networked service between the first group of users and the second group of users.

12. A system configured to provide a networked service to users over at least one network, the system comprising:
at least one storage configured to store, on a user-by-user basis, intrinsic service elements and environmental elements; and
at least one processor configured to:
receive, via the at least one network, requests for the networked service from a first plurality of the users;
select, in response to reception of the requests, a second plurality of the users from the first plurality of the users based on the intrinsic service elements;
match, according to a first scheme, users of the second plurality of the users to form a first group of users based on the environmental elements;
match, according to a second scheme different from the first scheme, users of the second plurality of users to form a second group of users based on the environmental elements; and
provide, over the at least one network, a session of the networked service between the first group of users and the second group of users.

13. The system of claim 12, wherein the intrinsic service element of a user of the second plurality of the users comprises information corresponding to at least one of a reception time of a request of the user, an option of the networked service set in association with the user, and a skill score set for the user according to a service process of the user.

14. The system of claim 12, wherein the environmental element of a user of the second plurality of the users comprises information corresponding to at least one of a nationality of the user, a race of the user, a gender of the user, an age of the user, a current access location of the user, a residential place of the user, a main access time of the user, a main access day of the user, a service start date of the user, a service use period of the user, an alma mater of the user, and a language of a user.

15. The system of claim 12, wherein, to form the first group of users or the second group of users, the at least one processor is configured to:
determine, based on the environment elements, environment weights for pairs of users from the second plurality of the users, each pair comprising a same reference user and a respectively different user from the second plurality of the users;
select one pair of users from the pairs of users based on the environment weights; and
match the same reference user to the respectively different user of the one pair of users.

16. The user matching system of claim 15, wherein the at least one processor is further configured to:
select one or more items of the environmental elements based on a service option set for each of the second plurality of the users; and
determine the environment weights based on the one or more items.

17. The method of claim 1, further comprising:
selecting a first advertisement based on environmental elements stored in association with users forming the first group of users; and
providing the first advertisement to the users forming the first group of users.

18. The method of claim 17, wherein the first advertisement is provided during the session to the users forming the first group of users.

19. The method of claim 18, wherein a second advertisement is provided during the session to users forming the second group of users, the second advertisement being different from the first advertisement.

20. The method of claim 1, further comprising:
matching, via the at least one processor according to a third scheme, the first group of users and the second group of users based on the environmental elements,
wherein the third scheme is different from the first scheme.

21. The method of claim 1, wherein:
the first group of users comprises a first set of users and a second set of users; and
the first scheme is applied differently to the first set of users than the second set of users.

22. The method of claim 1, wherein, within a determined time period for matching users, a user among the second plurality of users is, based on the environmental elements, dynamically added to the first group of users and dynamically removed from the first group of users.

* * * * *